(12) United States Patent
Yu

(10) Patent No.: US 8,937,693 B2
(45) Date of Patent: Jan. 20, 2015

(54) BACK LIGHT MODULE AND LIQUID CRYSTAL DISPLAY THEREOF

(75) Inventor: Gang Yu, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 151 days.

(21) Appl. No.: 13/378,126

(22) PCT Filed: Dec. 7, 2011

(86) PCT No.: PCT/CN2011/083608
§ 371 (c)(1),
(2), (4) Date: Dec. 14, 2011

(87) PCT Pub. No.: WO2013/082769
PCT Pub. Date: Jun. 13, 2013

(65) Prior Publication Data
US 2013/0141666 A1 Jun. 6, 2013

(30) Foreign Application Priority Data

Dec. 5, 2011 (CN) .......................... 2011 1 0397988

(51) Int. Cl.
*G02F 1/1333* (2006.01)
(52) U.S. Cl.
USPC .............................. 349/58; 362/632; 362/634
(58) Field of Classification Search
USPC ...................................................... 349/58, 60
See application file for complete search history.

(56) References Cited

U.S. PATENT DOCUMENTS

| 8,456,592 B2* | 6/2013 | Go et al. .......................... 349/65 |
| 2005/0195621 A1* | 9/2005 | Chang et al. .................. 362/634 |

(Continued)

FOREIGN PATENT DOCUMENTS

| CN | 1896830 A | 1/2007 |
| CN | 1979304 A | 6/2007 |

(Continued)

OTHER PUBLICATIONS

Zhou Yu, the International Searching Authority written comments, Sep. 2012, CN.

(Continued)

*Primary Examiner* — Richard Kim
*Assistant Examiner* — Kendrick Hsu
(74) *Attorney, Agent, or Firm* — Ipro, Inc.; Na Xu

(57) ABSTRACT

The present invention discloses a back light module and a liquid crystal display (LCD) thereof. The back light module comprises a light guide plate, an optical sheet laid on the light transmission surface of the light guide plate, wherein the edge of the optical sheet is fixed to the light guide plate by a plurality of positioning structures. With application of the positioning structures, because the expansion coefficient of the optical sheet is not nearly to that of the frame but is close to the thermal expansion rate of the light guide plate, after the optical sheet is fixed to the light guide plate, the light guide plate is expanded along with the expansion of the optical sheet when subject to heating, and shrunk along with the shrinking of the optical sheet when the temperature drops. Thus, the optical sheet is not easy to warp due to the minimum performance change of the optical sheet and the light guide plate, and the temperature environment is also very similar because the optical sheet is near to the light guide plate. Therefore, as compared with the frame, the temperature of the optical sheet is more similar to that of the light guide plate, and the thermal expansion rate of the optical sheet is also similar to that of the light guide plate. Thereby, the warping of the optical sheet is further decreased.

16 Claims, 3 Drawing Sheets

(56) References Cited

U.S. PATENT DOCUMENTS

| | | |
|---|---|---|
| 2006/0028595 A1 | 2/2006 | Huang et al. |
| 2006/0061537 A1 | 3/2006 | Yu et al. |
| 2007/0091644 A1* | 4/2007 | Fujishima .................... 362/630 |

FOREIGN PATENT DOCUMENTS

| | | |
|---|---|---|
| CN | 200972512 Y | 11/2007 |
| CN | 101435948 A | 5/2009 |
| JP | 2009289597 A | 12/2009 |
| JP | 2011186179 A | 9/2011 |
| KR | 20040077172 A | 9/2004 |

OTHER PUBLICATIONS

Chen Xijie, the first office action, Mar. 2013, CN.

* cited by examiner though the thermal expansion rate of the optical sheet is nearly to that of the light guide plate, but there would be some differences, if the relative position between the optical sheet and the light guide plate is completely fixed, when the temperature changes, the optical sheet extruded by the card may be slight warpage, and thereby affecting the display quality. Card hole wider than the thickness of the card can guarantee that the optical sheet has a certain movable margin to further avoid the possibility of warping.

BACK LIGHT MODULE AND LIQUID CRYSTAL DISPLAY THEREOF

This application is the U.S. national phase of International Application No. PCT/CN11/83608, filed 7 Dec. 2011, which designated the U.S. and claims priority to CN Application No. 201103979886, filed 2 Dec. 2011, the entire contents of each of which are hereby incorporated by reference.

TECHNICAL FIELD

The present invention relates to the field of displays, in particular to a back light module and a liquid crystal display (LCD) thereof.

BACKGROUND

The LCD comprises a LCD panel. A back light module needs to be arranged at the bottom of the LCD panel due to that the liquid crystal can not give out light. The back light module can be arranged in a directly-down mode or a side-light mode according to the installation locations of a light source. The back light module in a directly-down mode comprises a light guide plate and an optical sheet covered on the light transmission surface of the light guide plate, and the side surface of the light guide plate is provided with the light source. As shown in FIG. 1, in the prior art, the optical sheet 100 is usually positioned by riveted metal posts 200 on the frame 300 of the LCD, but the factors such as temperature changes, etc. resulting in thermal expansion and cold contraction are not taken into account, so the deformation or warping of the optical sheet 100 with uneven optical performance will be caused.

SUMMARY

The aim of the present invention is to provide a back light module for avoiding the warping of an optical sheet and improving the optical performance, and a LCD thereof.

The aim of the present invention is achieved by the following technical schemes:

A back light module comprises a light guide plate, an optical sheet laid on the light transmission surface of the light guide plate. The edge of the optical sheet is fixed to the light guide plate by a plurality of positioning structures.

Preferably, one end of the positioning structure is fixed to the side surface of the light guide plate, and the other end is provided with a hanging card; a card hole corresponding to the hanging card is arranged at the edge of the optical sheet, and the hanging card passes through the card hole. As a concrete form of the positioning structure, the fitting of the card and the card hole is convenient for installation or removal of the positioning structure.

Preferably, one end of the positioning structure fixed to the side surface of the light guide plate is provided with a hole, i.e. the positioning structure is fixed to the side surface of the light guide plate by screws passing through the hole. This is one fixing form of the positioning structure.

Preferably, one end of the positioning structure fixed to the side surface of the light guide plate is provided with a lug, and a groove corresponding to the lug is arranged on the side surface of the light guide plate; thus, the hanging card is fixed to the light guide plate by inserting the lug into the groove. This is another fixing form of the positioning structure for which the assembly can be realized without additional components, so the installation process is simple and high-efficient.

Preferably, the center of the lug is a cylinder on the surface of which two quadratic child lugs are extended, which is another concrete form of the lug. The cylinder is convenient for the lug to be inserted into the groove, and the child lugs at both sides of the lug is used for positioning so as to prevent the groove from rotating in the groove.

Preferably, the width of the card hole is greater than the thickness of the card. Although the thermal expansion rate of the optical sheet is nearly to that of the light guide plate, but there would be some differences, if the relative position between the optical sheet and the light guide plate is completely fixed, when the temperature changes, the optical sheet extruded by the card may be slight warpage, and thereby affecting the display quality. Card hole wider than the thickness of the card can guarantee that the optical sheet has a certain movable margin to further avoid the possibility of warping.

Preferably, the card directly contacts with one end of the card hole far away from the light guide plate. In the initial assembly, the card should lean against the card hole far away from one end of the light guide, so as to ensure that the optical sheet is stretched outwards, and the possibility of warping is avoided.

A LCD comprises the back light module.

The edge of the optical sheet is fixed to the light guide plate by the positioning structures. Because the expansion coefficient of the optical sheet is not nearly to that of the frame but is close to the thermal expansion rate of the light guide plate, after the optical sheet is fixed to the light guide plate, the light guide plate is expanded along with the expansion of the optical sheet when subject to heating, and shrunk along with the shrinking of the optical sheet when the temperature drops. The optical sheet is not easy to warp due to the minimum change in expansion/contraction difference between the optical sheet and the light guide plate, and the temperature environment is also very similar because the optical sheet is near to the light guide plate. Therefore, as compared with the frame, the temperature of the optical sheet is more similar to that of the light guide plate, and the thermal expansion rate of the optical sheet is also more similar to that of the light guide plate. Thereby, the warping of the optical sheet is further decreased.

DETAILED DESCRIPTION

The present invention is further described by figures and the preferred embodiments as follows.

The LCD comprises a LCD panel and a back light module. The back light module comprises a light guide plate, an optical sheet laid on the light transmission surface of the light guide plate, and the edge of the optical sheet is fixed to the light guide plate by a plurality of positioning structures.

Embodiment 1

Figure 1:
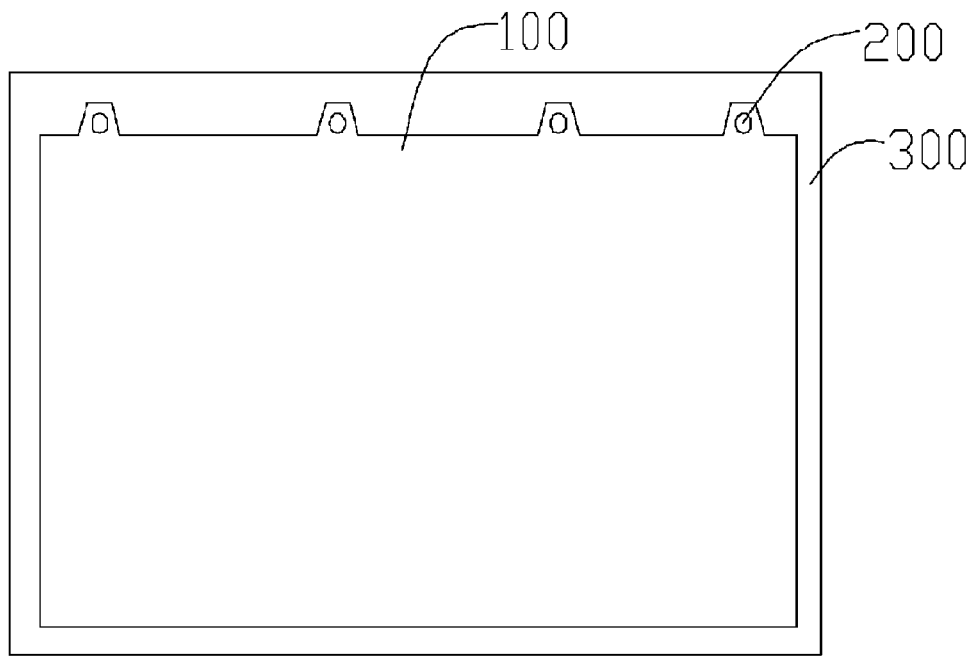
FIG. 1 is the fixing form of the optical sheet in the prior art.
Figure 2:
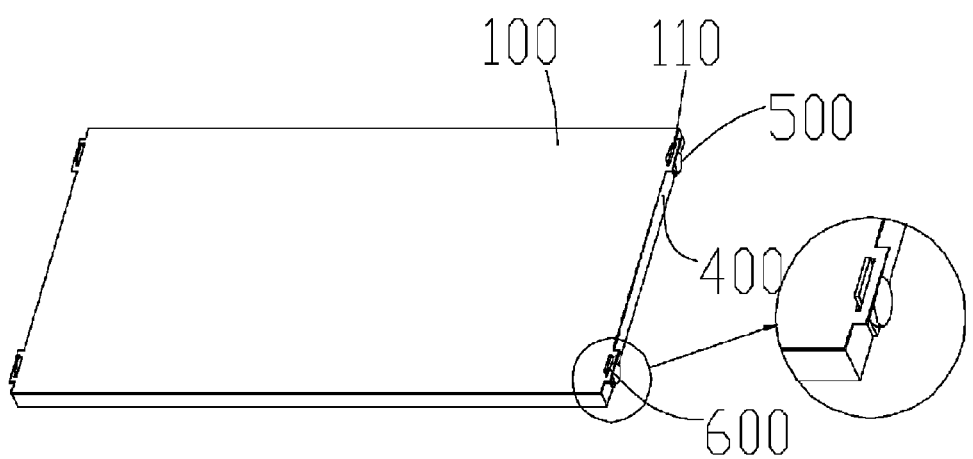
FIG. 2 is the fixing diagram of the optical sheet of the first embodiment of the present invention.
Figure 3:
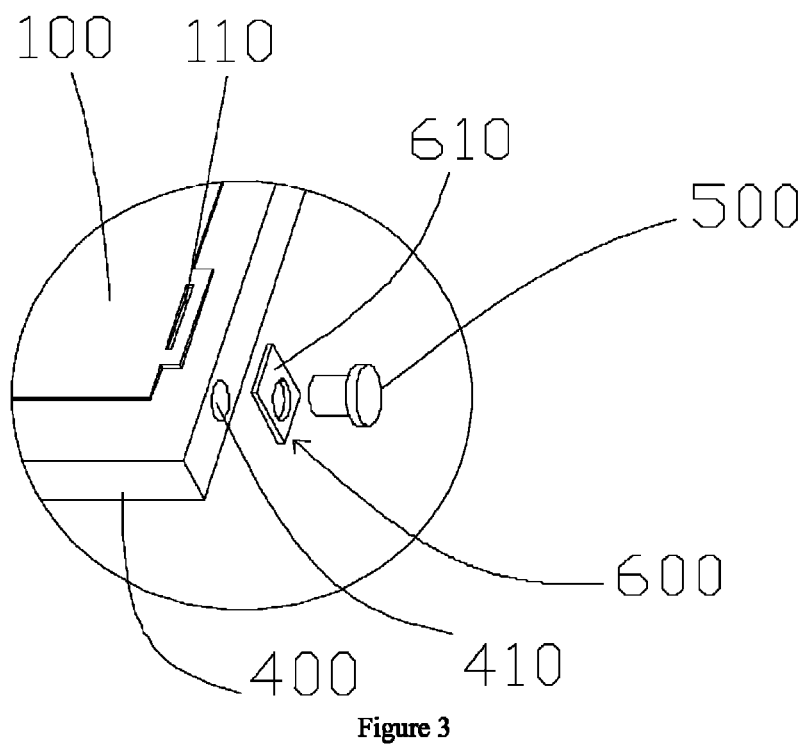
FIG. 3 is the fixing explosion diagram of the optical sheet of the first embodiment of the present invention.

As shown in FIG. 2 and FIG. 3, the positioning structure is a card with a hole and is fixed to the side surface of the light guide plate by screws passing through the hole, i.e. the side surface of the light guide plate is provided with a screw hole, and the card is fixed by the screws after the hole of the card is aligned with the crew hole. Otherwise, the card can be fixed to the light guide plate in a rivet joint mode or by bond master, etc. On the other hand, the edge of the optical module is provided with a card hole, and the hanging end of the card can pass through the card hole to realize positioning. The light guide plate affected by the heat or the ambient humidity can generate the phenomenon of thermal expansion and cold contraction, and the card can move along with the light guide plate, so that the optical sheet can be held always by the positioning structures to make it in an even state, so as to avoid the warping, etc.

Although the thermal expansion rate of the optical sheet is nearly to that of the light guide plate, but there would be some differences, if the relative position between the optical sheet and the light guide plate is completely fixed, when the temperature changes, the optical sheet extruded by the card may be slight warpage, and thereby affecting the display quality. The width of the card hole is greater than the thickness of the card, and the card directly contact with one end of the card hole far away from the light guide plate. Thus, in the initial assembly, the card leans against the card hole away from one end of the light guide, so the card hole wider than the thickness of the card can guarantee that the optical sheet has a certain movable margin to further reduce the possibility of warping even through the optical sheet and the light guide plate have some differences in thermal expansion, and the also can guarantee that the optical sheet is stretched towards all long to avoid the warping and improve the display quality.

Otherwise, the card can be fixed to the light guide plate in a rivet joint mode or by bond master, etc.

Embodiment 2

Figure 4:
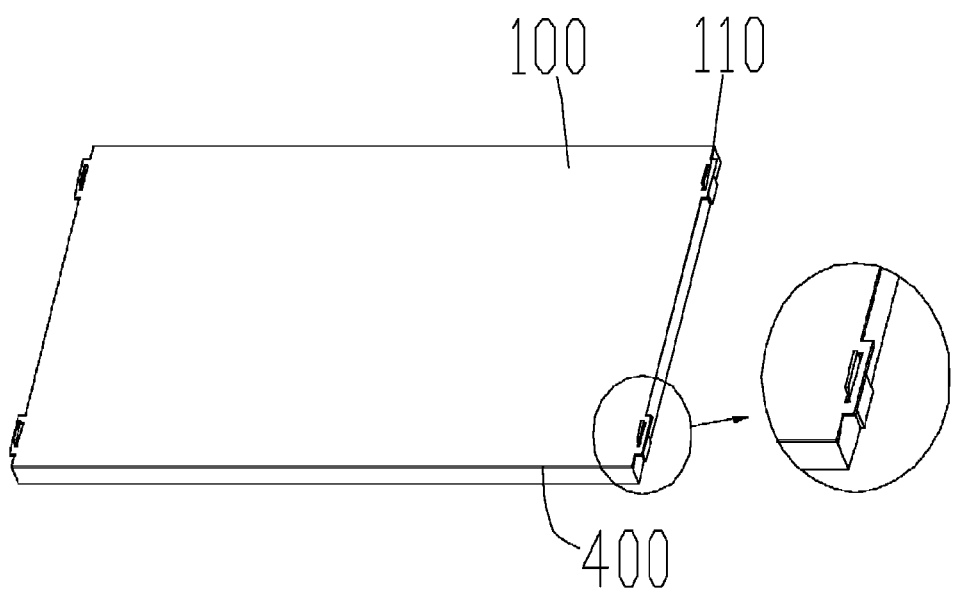
FIG. 4 is the fixing diagram of the optical sheet of the second embodiment of the present invention.
Figure 5:
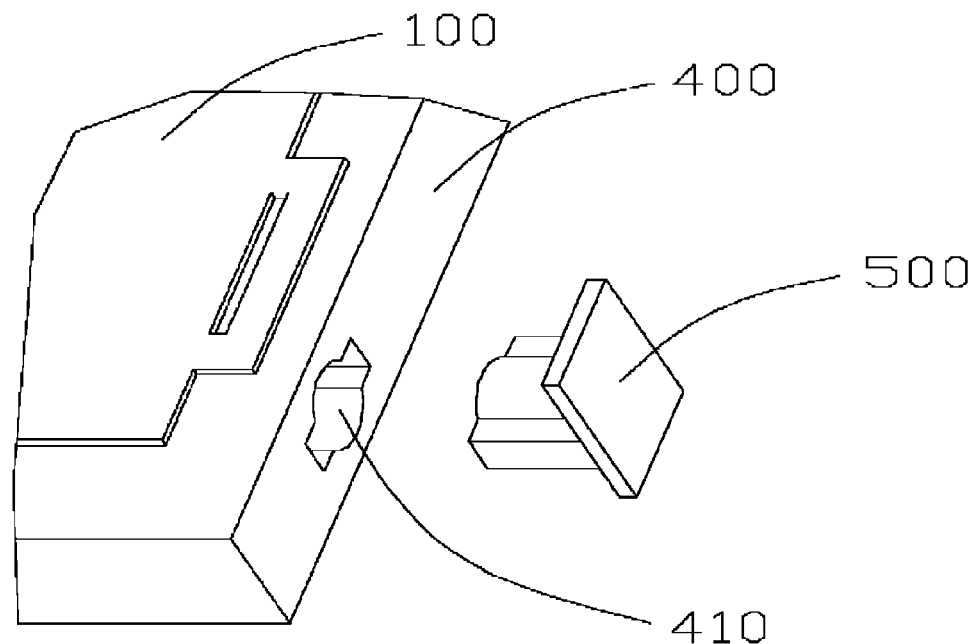
FIG. 5 is the fixing explosion diagram of the optical sheet of the second embodiment of the present invention.
Figure 6:
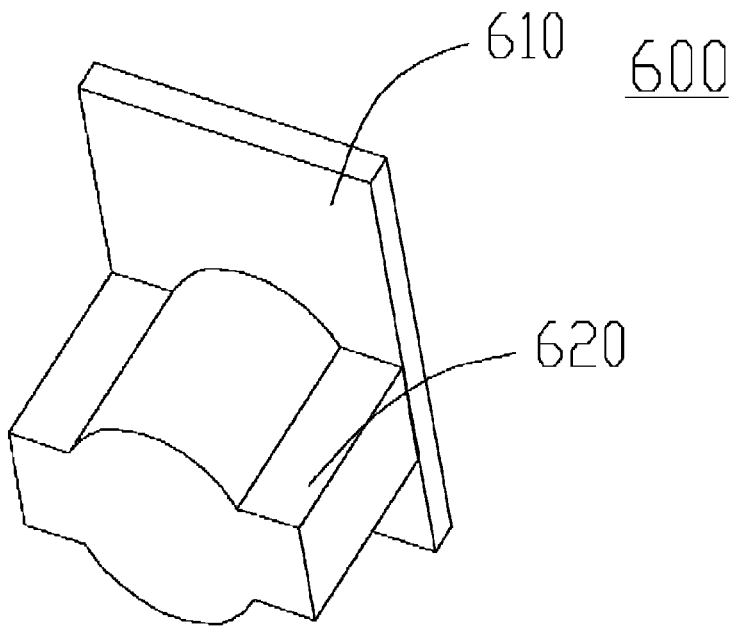
FIG. 6 is the structural diagram of the positioning structure of the second embodiment of the present invention;
Wherein, 100.optical sheet, 100. 200.metal post, 300.frame, 400.light guide plate, 410.screw hole, 500.screw, 600.positioning structure, 610.card and 620.lug.

As shown in FIG. 4, FIG. 5 and FIG. 6, the edge of the optical module is provided with the card hole, the positioning structure is fixed to the side surface of the light guide plate, one end of the positioning structure fixed to the side surface of the light guide plate is provided with a lug, and the other end is provided with a card. A corresponding groove is arranged at the side surface of the light guide plate, and the lug is fixed to the light guide plate by inserting the lug into the groove. The positioning structure is fixed to the optical sheet by the card passing through the card hole. The light guide plate affected by the heat or the ambient humidity can generate the phenomenon of thermal expansion and cold contraction, and the card can move along with the light guide plate, so that the optical sheet can be held always by the positioning structures to make it in an even state, so as to avoid the warping, etc.

The center of the lug is a cylinder on the surface of which two quadratic child lugs are extended. The cylinder is convenient for the lug to be inserted into the groove, and the child lugs at both sides of the lug is used for positioning so as to prevent the groove from rotating in the groove. The lug can be in a wedge shape or other shapes easily matching with the groove. In addition, the card can be fixed to the light guide plate in a rivet joint mode or by bond master, etc.

Although the thermal expansion rate of the optical sheet is nearly to that of the light guide plate, but there would be some differences, if the relative position between the optical sheet and the light guide plate is completely fixed, when the temperature changes, the optical sheet extruded by the card may be slight warpage, and thereby affecting the display quality. The width of the card hole is greater than the thickness of the card, and the card directly contact with one end of the card hole far away from the light guide plate. Thus, in the initial assembly, the card should lean against the card hole away from one end of the light guide, so the card hole wider than the thickness of the card can guarantee that the optical sheet has a certain movable margin to further reduce the possibility of warping even through the optical sheet and the light guide plate have some differences in thermal expansion, and the also can guarantee that the optical sheet is stretched towards all long to avoid the warping and improve the display quality.

The present invention is described in detail in accordance with the above contents with the specific preferred embodiments. However, the present invention is not limited to the specific embodiments. For the ordinary technical personnel of the technical field of the present invention, on the premise of keeping the concept of the present invention, the technical personnel can also make simple deductions or replacements, and all of which should be considered to belong to the protection scope of the present invention.

The invention claimed is:

1. A back light module, comprising a light guide plate and an optical sheet laid on a light transmission surface of the light guide plate; an edge of the optical sheet is fixed to the said light guide plate by a plurality of positioning structures, and a side surface between the light transmission surface and an opposite surface of the light transmission surface defines a fixing hole to fix one end of the positioning structure, wherein the positioning structure comprises a lug and two rectangular sub-blocks extending from two opposite sides of the lug, and two rectangular sub-blocks are inserted into the fixing hole to latch the light guide plate.

2. The back light module of claim 1, wherein the other end of the positioning structure provided with a hanging card; correspondingly, a card hole through which the card passes is arranged on the edge of the optical sheet.

3. The back light module of claim 2, wherein a groove corresponding to the lug is arranged on the side surface of the light guide plate; thus, the hanging card is fixed to the light guide plate by inserting the lug into the groove.

4. The back light module of claim 3, wherein a center of the lug is a cylinder, and the two sub-blocks extend from a surface of the cylinder.

5. The back light module of claim 3, wherein the lug and the hanging card are integrally formed.

6. The back light module of claim 2, wherein a width of the card hole is greater than a thickness of the card.

7. The back light module of claim 6, wherein said card directly contacts with one end of the card hole far away from the light guide plate.

8. A liquid crystal display (LCD), comprising the back light module of claim 1; said back light module comprises a light guide plate and an optical sheet laid on a light transmission surface of the light guide plate; an edge of the optical sheet is fixed to the light guide plate by a plurality of positioning structures, and a side surface between the light transmission surface and an opposite surface of the light transmission surface defines a fixing hole to fix one end of the positioning structure, wherein the positioning structure comprises a lug and two rectangular sub-blocks extending from two opposite sides of the lug, and two rectangular sub-blocks are inserted into the fixing hole to latch the light guide plate.

9. The LCD of claim 8, wherein the other end of the positioning structure provided with a hanging card; correspondingly, a card hole through which the card passes is arranged on the edge of the optical sheet.

10. The LCD of claim 9, wherein a groove corresponding to the lug is arranged on the side surface of the light guide plate; thus, the hanging card is fixed to the light guide plate by inserting the lug into the groove.

11. The LCD of claim 10, wherein a center of the lug is a cylinder, and the two sub-blocks extend from a surface of the cylinder.

12. The LCD of claim 10, wherein the lug and the hanging card are integrally formed.

13. The LCD of claim 9, wherein a width of the card hole is greater than a thickness of the card.

14. The LCD of claim 13, wherein said card directly contact with one end of the card hole far away from the light guide plate.

15. The LCD of claim 8, wherein the lug is parallel to the light transmission surface when the lug is inserted to the fixing hole.

16. The back light module of claim 1, wherein the lug is parallel to the light transmission surface when the lug is inserted to the fixing hole.

* * * * *